(12) United States Patent
Fukushima

(10) Patent No.: US 7,760,878 B2
(45) Date of Patent: Jul. 20, 2010

(54) RECORDING APPARATUS, PLAYBACK APPARATUS, AND PRIVACY PROTECTING METHOD

(75) Inventor: Nobuo Fukushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1164 days.

(21) Appl. No.: 10/850,237

(22) Filed: May 20, 2004

(65) Prior Publication Data

US 2004/0246856 A1 Dec. 9, 2004

(30) Foreign Application Priority Data

May 21, 2003 (JP) .............................. 2003-142907

(51) Int. Cl.
*H04N 7/167* (2006.01)
(52) U.S. Cl. ...................................... 380/211
(58) Field of Classification Search .................. 380/211
See application file for complete search history.

(56) References Cited

U.S. PATENT DOCUMENTS

| | | | | |
|---|---|---|---|---|
| 4,829,388 A | * | 5/1989 | Nakayama et al. ............ 386/47 |
| 5,159,324 A | * | 10/1992 | Ohtani et al. ................ 715/827 |
| 6,091,822 A | * | 7/2000 | Mellows et al. ............. 380/210 |
| 6,111,605 A | * | 8/2000 | Suzuki ..................... 348/220.1 |
| 6,489,999 B1 | * | 12/2002 | Okabe ........................ 348/460 |
| 6,650,831 B1 | * | 11/2003 | Thompson ..................... 396/6 |
| 2001/0020977 A1 | * | 9/2001 | Watanabe .................... 348/222 |
| 2002/0092021 A1 | * | 7/2002 | Yap et al. ....................... 725/55 |
| 2002/0147858 A1 | * | 10/2002 | Motoyama et al. .......... 709/318 |
| 2002/0174430 A1 | * | 11/2002 | Ellis et al. ...................... 725/46 |
| 2002/0176691 A1 | * | 11/2002 | Muguruma et al. ........... 386/83 |
| 2003/0046592 A1 | * | 3/2003 | Woodruff .................... 713/202 |

\* cited by examiner

*Primary Examiner*—Nasser Moazzami
*Assistant Examiner*—Michael S McNally
(74) *Attorney, Agent, or Firm*—Cowan, Liebowitz & Latman, P.C.

(57) ABSTRACT

A recording or playback apparatus classifies privacy-related information such as information concerning an operation of an apparatus and information for identifying an operator into, e.g., an individual identification information category, playback contents information category, apparatus maintenance information category, and photographing environment information category, and controls recording, playback, display, transfer, or erase of the privacy-related information by the apparatus in accordance with the classified categories.

3 Claims, 12 Drawing Sheets

FIG. 5

SELECT CATEGORY TO BE SET

■ PERSONAL INFORMATION MANAGEMENT

☐ PLAYBACK CONTENTS INFORMATION MANAGEMENT

☐ PHOTOGRAPHING ENVIRONMENT INFORMATION MANAGEMENT

NEXT

FIG. 6

SELECT ITEMS TO BE RECORDED
ITEMS INDICATED BY ■ ARE RECORDED

■ NAME
☐ ADDRESS
☐ TELEPHONE NUMBER
☐ MAIL ADDRESS
☐ FINGERPRINT

| SAVE | CANCEL | END | TO ERASE WINDOW |

FIG. 7

FOLLOWING INFORMATION IS ERASED
ITEMS INDICATED BY ■ ARE ERASED

■ NAME
■ ADDRESS
■ TELEPHONE NUMBER
■ MAIL ADDRESS
■ FINGERPRINT

| EXECUTE | CANCEL | END |

F I G. 11
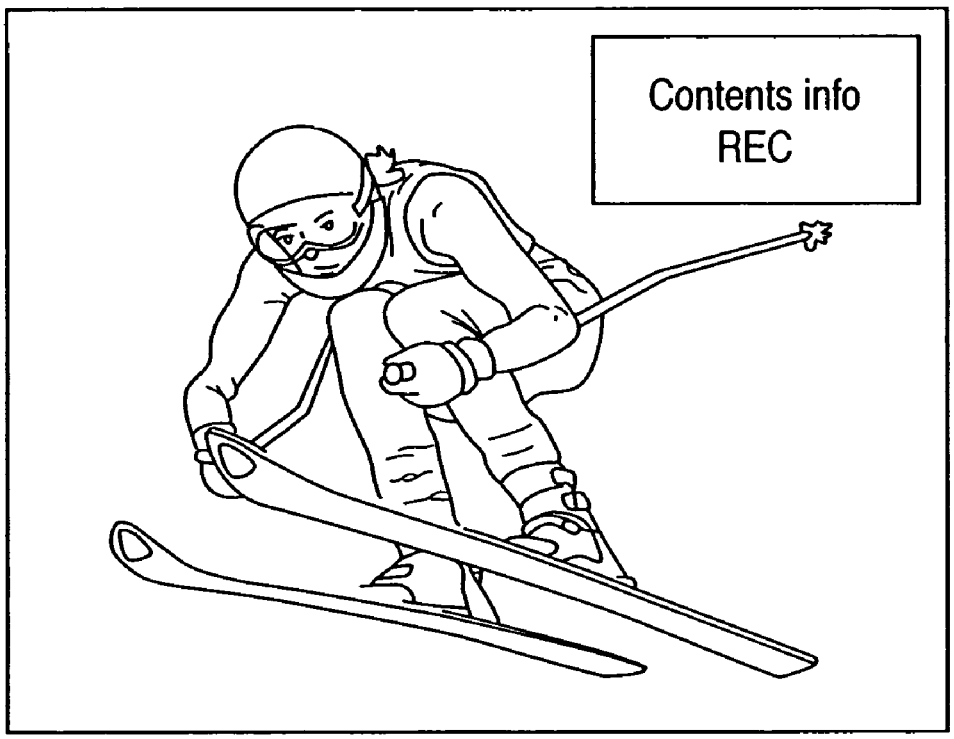

RECORDING APPARATUS, PLAYBACK APPARATUS, AND PRIVACY PROTECTING METHOD

FIELD OF THE INVENTION

The present invention relates to a recording apparatus, playback apparatus, and privacy protecting method and, more particularly, to a recording apparatus, playback apparatus, and privacy protecting method by which the operation logs of the apparatuses are controlled from the viewpoint of privacy protection.

BACKGROUND OF THE INVENTION

Some recording/playback apparatuses such as digital video recorders which digitally record video information on disk recording media such as a DVD±R and DVD±RW have a function of saving information (so-called play list information) indicating the order in which a plurality of pieces of video information were played back, or the order in which the user wants to play back a plurality of pieces of video information. This function is convenient in that the user can play back favorite information in a favorite order by a favorite method.

The type of information, however, which the user was interested in and played back is related to his or her privacy.

Some application software, e.g., web browser software, of personal computers allow the user to set the conditions concerning the protection of user's privacy. With this software, the user can set privacy protection items when installing the software, and can change the setting in a setting window after the installation.

Unfortunately, apparatuses such as video cameras do not take a sufficient measure to protect the privacy not only for play lists but also for operation logs, when compared to the field of computers. Also, the system configurations of such apparatuses are different from those of personal computers. This makes it difficult to set the conditions for privacy protection by the same method as application software of personal computers. That is, for example, the display screens are smaller than those of personal computers, and input means usable to set the conditions are also limited. Therefore, the operation is very troublesome if the number of set items is large. In addition, although a computer can identify the user by the user name and password, video cameras do not generally have a function of identifying the user.

SUMMARY OF THE INVENTION

An object of the present invention is to overcome the above-described drawbacks.

Another object of the present invention is to provide an apparatus and a method, even when an apparatus whose resources usable for setting are limited more than a personal computer is used, information such as manipulation information and operation data of the apparatus, which the user does not want to allow another person or an outsider to know, can be appropriately protected by a simple method.

According to an aspect of the present invention, an information recording apparatus classifying information concerning an operation of the apparatus and information for identifying an operator into at least one of an individual identification information category, playback contents information category, apparatus maintenance information category, and photographing environment information category, in order to classify the information into privacy-related information and other information, and controlling recording, playback, display, transfer, or erase of the operation information by the apparatus in accordance with the classified categories.

According to another aspect of the present invention, a recording apparatus having image sensing recording means for sensing an object image and recording the image as image information, comprising: privacy protecting means for classifying information concerning an operation of the apparatus and information for identifying an operator into at least one of an individual identification information category, playback contents information category, apparatus maintenance information category, and photographing environment information category, in order to classify the information into privacy-related information and other information, and controlling recording, playback, display, transfer, or erase of the operation information by the apparatus in accordance with the classified categories, wherein the individual identification information category is information capable of identifying an individual, and contains at least one of an operator's fingerprint, iris, blood vessel, voiceprint, address, name, age, telephone number, and mail address, the playback contents information category contains at least one of contents information by which a date and location on which the contents are played back by the apparatus, and a type and contents of the played back data can be determined, the apparatus maintenance information category is necessary for at least one of repair and maintenance of the apparatus, and contains at least one of the number of operation times and an operation time of a predetermined member having a predetermined number of times of use and a predetermined use period, and operation information for debugging software of the apparatus, the photographing environmental information category relates to a photographing environment, and contains at least one of an operation time, operation place, temperature, humidity, and weather at the time of photographing, and at least one of a frequency timing at which a user is urged to set an information management method and a method of displaying a management state changes in accordance with the classified categories.

According to further aspect of the present invention, a playback apparatus having means for playing back a recorded image, comprising: privacy protecting means for classifying information concerning an operation of the apparatus and information for identifying an operator into at least one of an individual identification information category, playback contents information category, apparatus maintenance information category, and photographing environment information category, in order to classify the information into privacy-related information and other information, and controlling recording, playback, display, transfer, or erase of the operation information by the apparatus in accordance with the classified categories, wherein the individual identification information category is information capable of identifying an individual, and contains at least one of an operator's fingerprint, iris, blood vessel, voiceprint, address, name, age, telephone number, and mail address, the playback contents information category contains at least one of contents information by which a date and location on which the contents are played back by the apparatus, and a type and contents of the played back data can be determined, the apparatus maintenance information category is necessary for at least one of repair and maintenance of the apparatus, and contains at least one of the number of times of operation and an operation time of a predetermined member having a predetermined number of times of use and a predetermined use period, and operation information for debugging software of the apparatus, the photographing environmental information category relates to a photographing environment, and contains at least one of an operation time, operation place, temperature, humidity, and weather at the time of photographing, and at least one of a frequency timing at which a user is urged to set an information management method and a method of displaying a management state changes in accordance with the classified categories.

According to still further aspect of the present invention, a method of protecting privacy of an operator comprising: classifying information concerning an operation of the apparatus and information for identifying an operator into at least one of an individual identification information category, playback contents information category, apparatus maintenance information category, and photographing environment information category, in order to classify the information into privacy-related information and other information; and controlling recording, playback, display, transfer, or erase of the operation information by the apparatus in accordance with the classified categories.

According to yet another aspect of the present invention, a method of protecting privacy of an operator in a recording apparatus having image sensing/recording means for sensing an object image and recording the image as image information, comprising: classifying information concerning an operation of the apparatus and information for identifying an operator into at least one of an individual identification information category, playback contents information category, apparatus maintenance information category, and photographing environment information category, in order to classify the information into privacy-related information and other information; and controlling recording, playback, display, transfer, or erase of the operation information by the apparatus in accordance with the classified categories, wherein the individual identification information category is information capable of identifying an individual, and contains at least one of an operator's fingerprint, iris, blood vessel, voiceprint, address, name, age, telephone number, and mail address, the playback contents information category contains at least one of contents information by which a date and location on which the contents are played back by the apparatus, and a type and contents of the played back data can be determined, the apparatus maintenance information category is necessary for at least one of repair and maintenance of the apparatus, and contains at least one of the number of times of operation and an operation time of a predetermined member having a predetermined number of times of use and a predetermined use period, and operation information for debugging software of the apparatus, the photographing environmental information category relates to a photographing environment, and contains at least one of an operation time, operation place, temperature, humidity, and weather at the time of photographing, and at least one of a frequency timing at which a user is urged to set an information management method and a method of displaying a management state changes in accordance with the classified categories.

According to further aspect of the present invention, a method of protecting privacy of an operator in a playback apparatus having means for playing back a recorded image, comprising: classifying information concerning an operation of the apparatus and information for identifying an operator into at least one of an individual identification information category, playback contents information category, apparatus maintenance information category, and photographing environment information category, in order to classify the information into privacy-related information and other information; and controlling recording, playback, display, transfer, or erase of the operation information by the apparatus in accordance with the classified categories, wherein the individual identification information category is information capable of identifying an individual, and contains at least one of an operator's fingerprint, iris, blood vessel, voiceprint, address, name, age, telephone number, and mail address, the playback contents information category contains at least one of contents information by which a date and location on which the contents are played back by the apparatus, and a type and contents of the played back data can be determined, the apparatus maintenance information category is necessary for at least one of repair and maintenance of the apparatus, and contains at least one of the number of times of operation and an operation time of a predetermined member having a predetermined number of times of use and a predetermined use period, and operation information for debugging software of the apparatus, the photographing environmental information category relates to a photographing environment, and contains at least one of an operation time, operation place, temperature, humidity, and weather at the time of photographing, and at least one of a frequency timing at which a user is urged to set an information management method and a method of displaying a management state changes in accordance with the classified categories.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5 to 9 are operation windows displayed when privacy-related information is set and managed in the video recorder integrated with a camera according to the embodiment of the present invention;

FIGS. 10 and 11 are images displayed when contents are played back by the video recorder integrated with a camera according to the embodiment of the present invention.

DETAILED DESCRIPTION OF THE PREFERRED EMBODIMENT

Preferred embodiments of the present invention will now be described in detail in accordance with the accompanying drawings.

Figure 1:
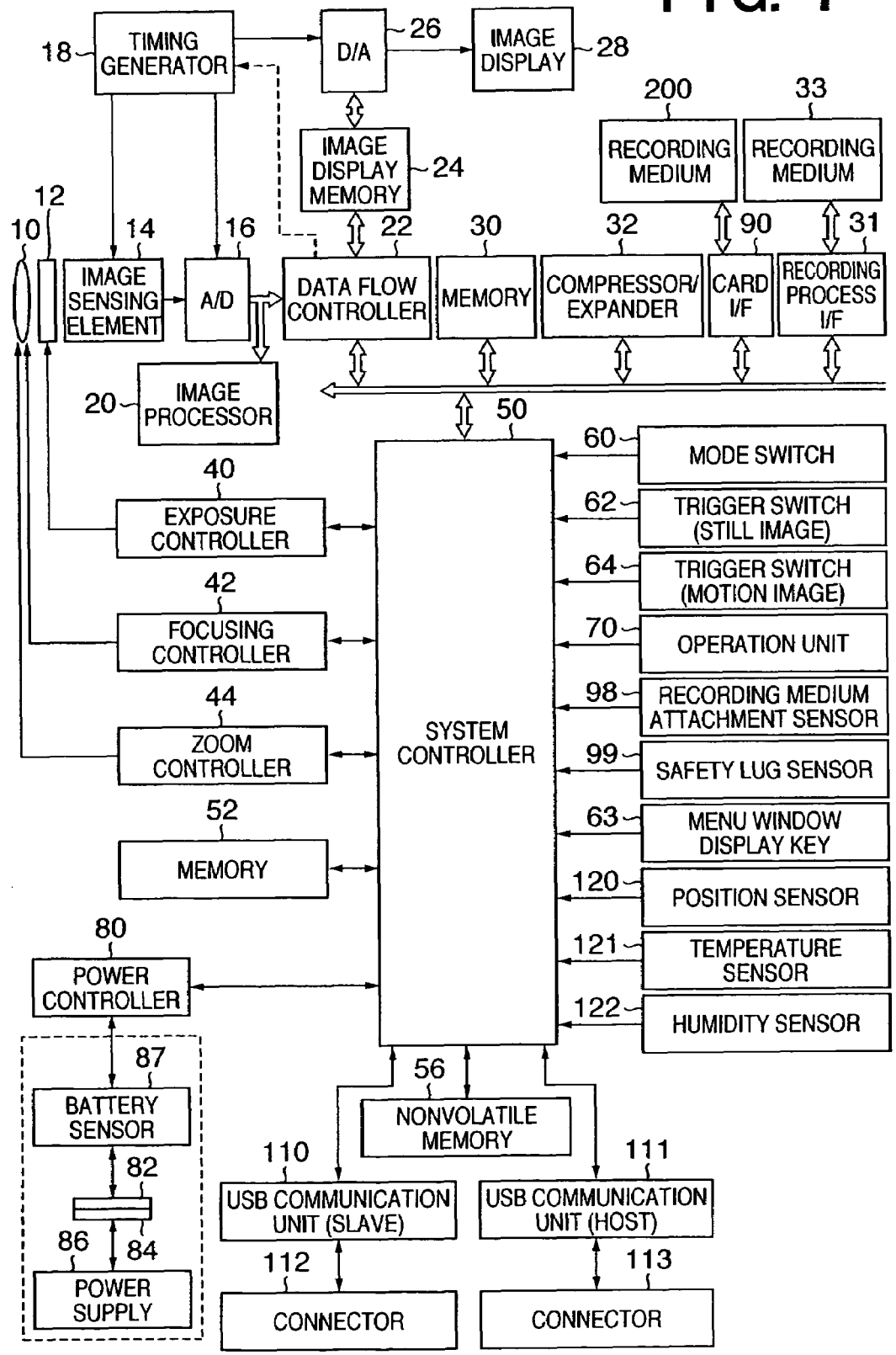
FIG. 1 is a block diagram showing an outline of the arrangement of a video recorder integrated with a camera which is one example of a recording apparatus according to an embodiment of the present invention.
Figure 2:
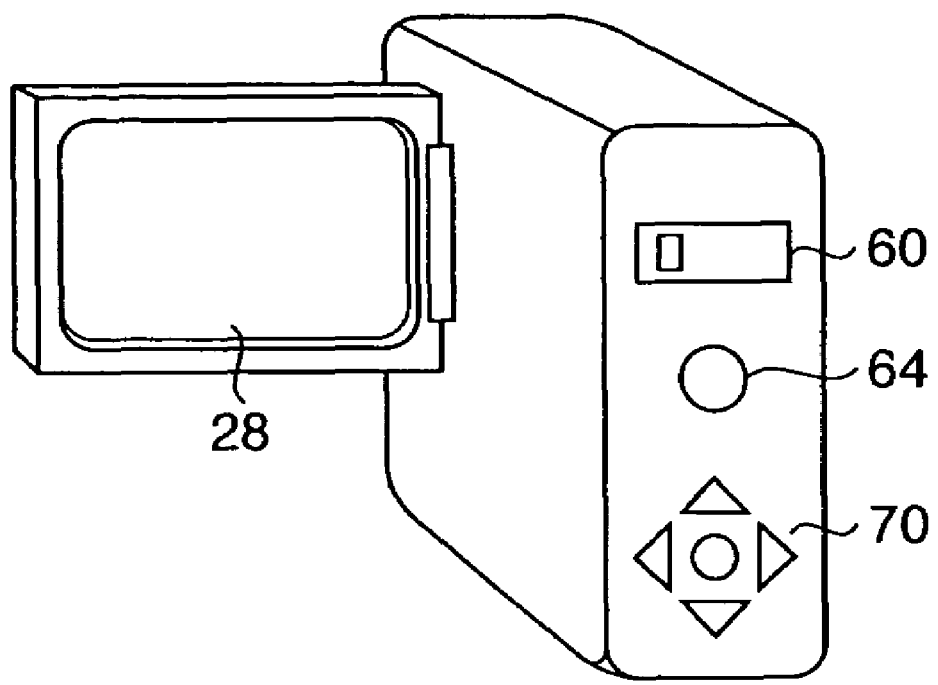
FIG. 2 is a perspective view showing the external appearance of the video recorder integrated with a camera shown in FIG. 1.

FIG. 1 is a block diagram showing an outline of the arrangement of a video recorder integrated with a camera which is one example of a recording apparatus according to an embodiment of the present invention. FIG. 2 is a perspective view showing the external appearance of the video recorder integrated with a camera shown in FIG. 1.

In FIG. 1, reference numeral 10 denotes a photographing lens; 12, exposure amount control members such as an aperture and shutter; 14, an image sensing element such as a CCD which converts an optical image into an electrical signal; and 16, an A/D converter for converting an analog signal output from the image sensing element 14 into a digital signal. A timing generator 18 supplies a clock signal and control signal to the image sensing element 14, the A/D converter 16, and a D/A converter 26.

An image processor 20 performs predetermined pixel interpolation and color conversion for the output data from the A/D converter 16. The image processor 20 also performs an arithmetic operation in order to control the exposure amount and focusing on the basis of the image data.

A data flow controller 22 controls input and output of data between the A/D converter 16, the timing generator 18, the image processor 20, an image display memory 24, the D/A converter 26, a memory 30, and a compressor/expander 32. During photographing and recording, data from the A/D converter 16 is written in the image display memory 24 or memory 30 via the image processor 20.

Reference numeral 24 denotes the image display memory; 26, the D/A converter; and 28, an image display made up of, e.g., TFT liquid crystal display device. Image data for display written in the image display memory 24 is displayed on the image display 28 via the D/A converter 26. An electronic finder function can be realized by displaying output images from the image sensing element 14 one by one on the screen of the image display 28.

Reference numeral 40 denotes an exposure controller for controlling the exposure amount control members (e.g., an aperture and shutter) 12; 42, a focusing controller for controlling focusing of the photographing lens 10; and 44, a zoom controller for controlling zooming of the photographing lens 10. On the basis of the result of calculation performed on the output image data from the image sensing element 14 by the image processor 20, a system controller 50 controls the exposure controller 40 and focusing controller 42 by using a TTL (Through The Lens) method, thereby controlling exposure and focusing.

The memory 30 stores photographed still images and motion images. The memory 30 has an enough storage amount to temporarily store a predetermined number of still images and a predetermined time of motion images. The memory 30 can also be used as a work area of the system controller 50.

The compressor/expander 32 compresses and expands image data. That is, the compressor/expander 32 loads an image stored in the memory 30, compresses or expands the loaded image, and writes the processed data in the memory 30.

Reference numeral 33 denotes a first recording medium such as a tape or disk. The first recording medium 33 is properly controlled by a control driver (not shown) which controls the running of a tape and the rotation of a tape drum, or a control driver (not shown) which controls the rotation of a disk and the head position.

A recording process interface (I/F) circuit 31 performs processing necessary to record data in the recording medium 33. For example, the recording process interface circuit 31 converts a signal so that the signal matches the recording format of the recording medium 33, or adds information to the signal.

Reference numeral 200 denotes a second recording medium. The recording medium 200 is a card-like recording medium which is a semiconductor memory or the like.

A card interface circuit 90 has a register and interface timing generator for exchanging commands with a recording medium such as a memory card or various interface cards.

A recording medium attachment sensor 98 senses whether the first recording medium 33 and second recording medium 200 are attached.

A safety lug sensor 99 senses the state of a safety lug of the first or second recording medium.

Reference numeral 50 denotes the system controller for controlling the overall the video recorder integrated with a camera; and 52, a memory such as a flash ROM for storing constants, variables, programs, and the like for operations of the system controller 50.

Reference numeral 56 denotes an electrically erasable and recordable nonvolatile memory such as an EEPROM for storing various adjusting values.

Figure 3:
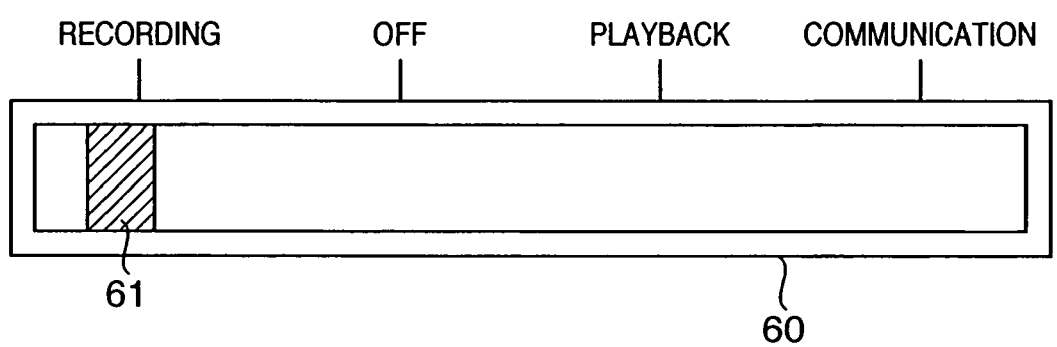
FIG. 3 is a plan view showing the arrangement of a mode switch 60.

Reference numeral 60 denotes a mode switch capable of switching various function modes such as a power-off mode, photographing/recording mode, playback mode, and communication mode. FIG. 3 is a plan view of the mode switch 60. In this embodiment, the mode switch is a slide switch with which the function modes can be switched by changing the position of a switch 61 to a position where a mode name is described.

Reference numeral 62 denotes a still image photographing trigger switch; 63, a menu window display key; 64; a motion image photographing trigger switch; and 70, an operation unit including a set button 71 and up, down, left, and down cursor key buttons 72.

A USB (Universal Serial Bus) communication unit 110 is an I/F unit as a slave. A USB communication unit 111 is an I/F unit as a host. A USB slave terminal 112 is a connector which allows the communication unit 110 to connect the video recorder integrated with a camera of this embodiment to another USB host apparatus by a cable (not shown). A USB host terminal 113 allows the communication unit 111 to connect the video recorder integrated with a camera of this embodiment to another USB slave apparatus by a cable (not shown).

A power controller 80 is made up of a DC-DC converter, a switch circuit for switching blocks to be powered, and the like. The power controller 80 detects the presence/absence of a battery, the type of the battery, and the remaining amount of the battery via a battery sensor 87. On the basis of the detection results and instructions from the system controller 50, the power controller 80 controls the DC-DC converter to supply a necessary voltage to the individual units including the recording media for a necessary period.

Reference numerals 82 and 84 denote connectors; and 86, a power supply. The power supply 86 is, e.g., a primary battery such as an alkali-manganese battery which cannot be charged, a chargeable secondary battery such as a lithium-ion battery, or an AC adaptor which converts AC power into DC power and supplies this DC power to the main body.

The battery sensor 87 senses the type of battery. For example, the type of battery can be determined by mechanically sensing the shape of the battery. It is also possible to determine the type of battery and the degree of consumption of the battery by measuring the internal resistance of the battery on the basis of the difference between a voltage when a predetermined amount of electric current flows and a voltage when no such electric current flows. When the battery itself has a communication unit, the type, the degree of consumption, and the like of the battery may also be sensed via the communication unit.

Reference numeral 120 denotes a position information sensor such as a GPS (Global Positioning System) receiver; 121, a temperature sensor; and 122, a humidity sensor.

The operation modes of the video recorder integrated with a camera of this embodiment will be explained below. The video recorder integrated with a camera of this embodiments has a motion image recording mode, still image recording mode, motion image playback mode, still image playback mode, and external connection mode.

The motion image recording mode is the same as that of the conventional video recorder integrated with a camera. When the start of photographing is designated by the motion image photographing trigger switch 64, an object image is continuously recorded as a motion image in the first or second recording medium. This object image currently being photographed is displayed on the image display 28.

The motion image playback mode is also the same as the playback function of the conventional video recorder integrated with a camera. Motion image data recorded in the first or second recording medium is played back, and displayed on the image display 28 or the like.

The still image recording mode is the same as the photographing function of a common digital still camera. When photographing is designated by the still image photographing trigger switch 62, an object image in an instant is recorded as a still image in the first or second recording medium. The photographed object image is displayed on the image display 28 by, e.g., a preview function.

The still image playback mode is the same as the playback function of a common digital still camera. Still image data recorded in the first or second recording medium is played back, and displayed on the image display 28 or the like.

In the external connection mode, the video recorder integrated with a camera connects to and communicates with an external apparatus (e.g., a personal computer) via the USB communication unit 110 or 111. For example, this mode is used to transfer data recorded in the first or second recording medium to a computer, or to directly transfer video data to a computer without recording the data in the first or second recording medium.

(Method of Managing, e.g., Privacy-Related Information)

Classification of privacy-related information into categories, a method of managing each category, and examples of management related to the operation of the apparatus of this embodiment will be explained in turn.

First, the information management method of each category will be described below. In this method, information is categorized, and limitations meeting the purpose are set for each category. These limitations include information recording destination limitations, limitations pertaining to operations such as recording, playback, transfer, copy, and erase, and limitations on display.

The types of categories and practical examples of limitations set for each category in this embodiment will be described below.

In this embodiment, a recording destination of information classified to "category 1" is limited to at least the apparatus main body. As a general rule, information is recorded in the nonvolatile memory 56. However, recording to the first and second recording media 33 and 200 is not inhibited. In accordance with the status and the purpose of the operation of the apparatus, information can also be recorded in the first or second recording medium 33 or 200.

The contents of "category 1" can identify an individual. Normally, only recording is permitted, and playback, transfer, and copy are inhibited. Also, the holding period of recorded information is set. If this period has expired, the information may also be automatically erased. This further improves the protection. The erase is performed by, e.g., combining operations of the operation unit 70. If the user wants to set limitations on the erase operation, a general method of requesting inputting of an ID or password is of course possible.

The way the information classified to category 1 is managed can be confirmed by a menu operation. When the menu window display key 63 is operated, a privacy data management window as shown in FIG. 5 is displayed. The user selects "PERSONAL INFORMATION MANAGEMENT" corresponding to category 1 by operating the operation unit 70, thereby switching to a personal information management window as shown in FIG. 6. The user selects items to be recorded, selects "SAVE" if the selected items are OK, and selects "CANCEL" if the original setting is OK. When "SAVE" is selected, the set contents are saved in the nonvolatile memory 56. To complete the setting, the user selects "END" to terminate the setting. When the user selects "TO ERASE WINDOW", a personal information erase window as shown in FIG. 7 is displayed. If personal information which the user wants to erase exists, he or she selects an item corresponding to the information, and selects "EXECUTE". If no item to be erased exists, the user selects "CANCEL". By selecting "END", the user can leave this setting mode. When "EXECUTE" is selected, the selected personal information is erased from the nonvolatile memory 56.

As shown in FIGS. 5 to 7, data with which an individual can be identified is not displayed in this embodiment. For example, information such as a fingerprint is used to authenticate an individual in this apparatus, but a fingerprint image itself is not displayed. When a fingerprint is to be used, a fingerprint reader is connected to the main body to save and collate fingerprints. It is of course also possible to incorporate the fingerprint reader into the apparatus.

Management of playback contents information classified to "category 2" will be explained next. A recording destination of information classified to category 2 is at least the nonvolatile memory 56 of the apparatus. Normally, playback contents information is presumably loaded from the first or second recording medium or loaded across a network by the apparatus. For example, when a recording medium recording a movie is played back by the apparatus, the apparatus records the time at which the movie is played back, the title of the movie, and the end of an already played back portion of the movie.

Figure 8:
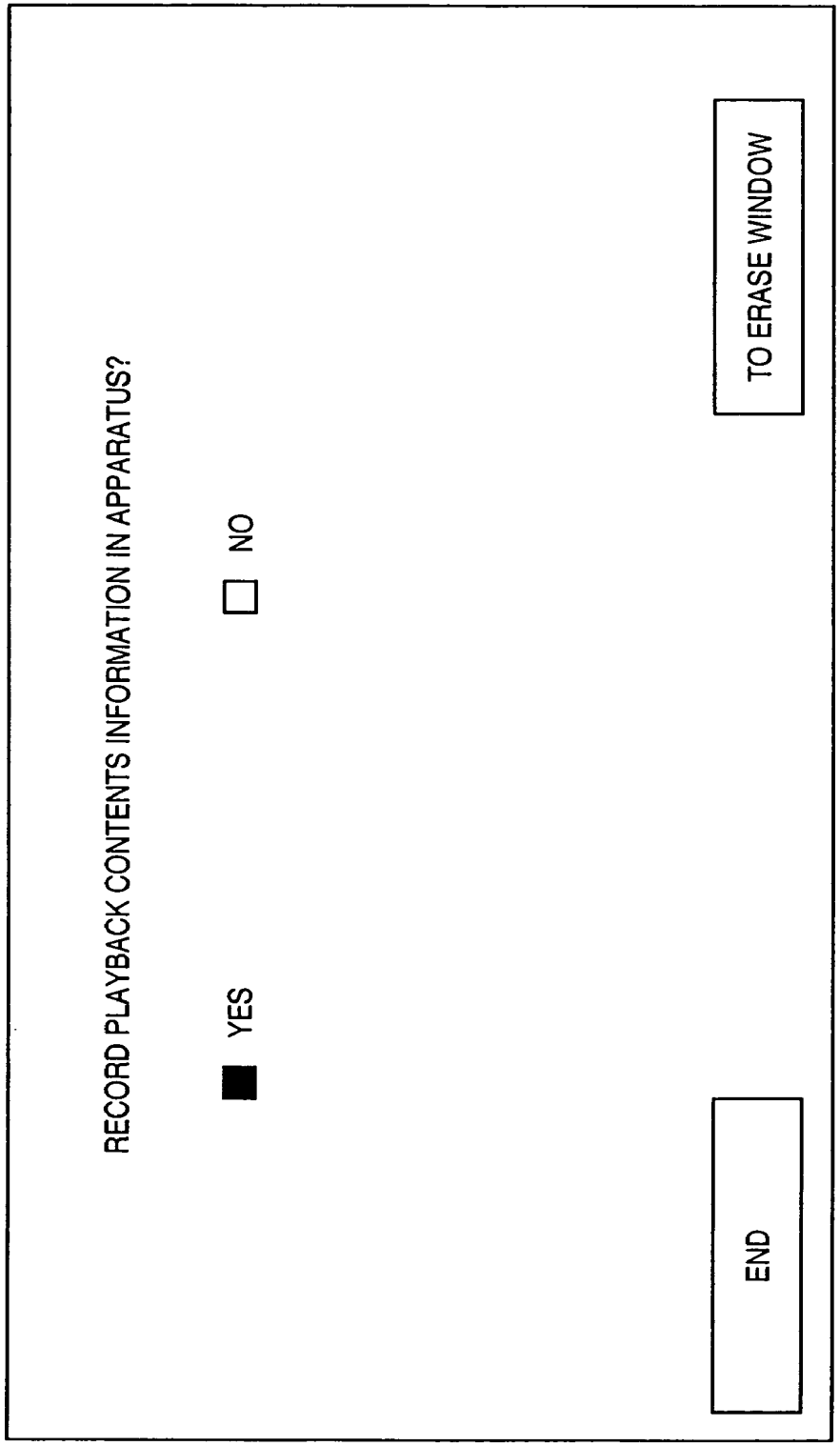
Figure 10:
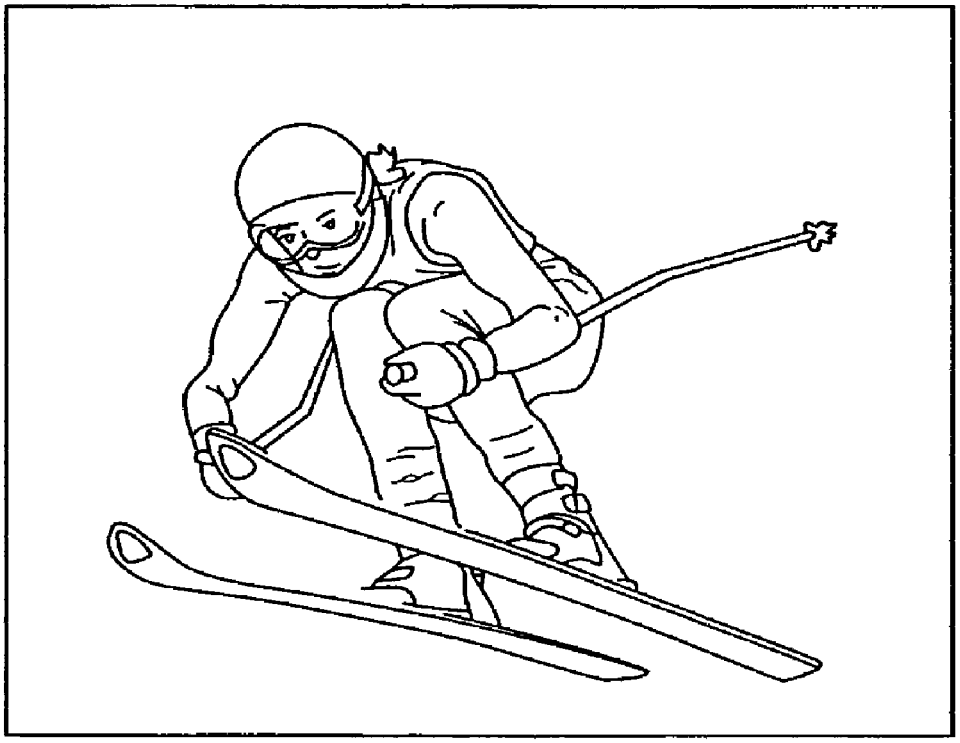

The means and method of privacy protection for this category previously ask the user to permit recording of information of category 2 into the nonvolatile memory 56 of the apparatus. That is, before contents are played back, a confirmation window as shown in FIG. 8 is presented to the user to ask him or her to agree with recording of information of the contents to be played back into the apparatus, and agree with the use and playback of the recorded contents information by the apparatus. In addition, as shown in FIGS. 10 and 11, while the contents of an image are played back, a message indicating that the contents information is being recorded in the apparatus is displayed.

After the contents information is recorded by the user's permission, read, transfer, and erase of this information from the memory are not limited, so the recorded information can be easily read out by anybody. If the apparatus is lent to another person, the recorded information may leak out.

Figure 9:
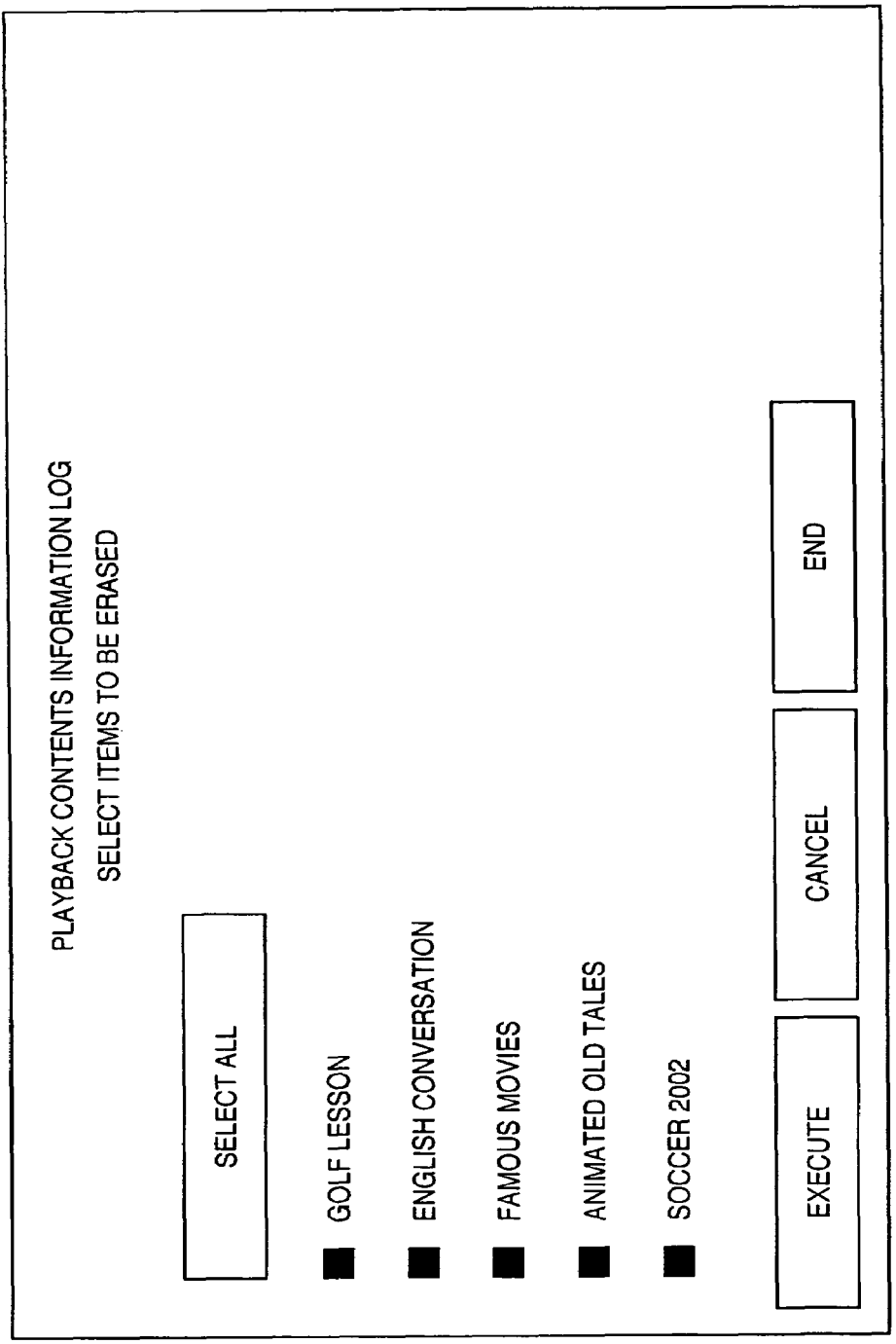

This embodiment eliminates this problem by providing a means for easily erasing recorded information. For example, the user selects playback contents information management in the menu window shown in FIG. 5 to display the playback contents information management window as shown in FIG. 8. In this window shown in FIG. 8, the user selects "TO ERASE WINDOW". Consequently, a playback contents information log window shown in FIG. 9 is displayed. In this window shown in FIG. 9, a list of contents whose information is recorded beforehand is displayed. If the user wants to erase all, he or she executes "SELECT ALL". Since the entire list is selected in this case, the user executes "END". To individually select items, the user selects only items to be erased, and executes "END".

On the other hand, if the user lends the apparatus only temporarily and wants to use the same contents information on the apparatus again, he or she transfers the data to an external apparatus such as a computer, or copies the data to another medium, e.g., the removable second recording medium 200, and then erases the information from the apparatus. After that, the user removes the second recording medium 200 from the apparatus, and lends the apparatus to another person. To reuse the erased information, the user need only copy the information from the second recording medium 200. For this reason, in this embodiment, read, transfer, and erase of information of category 2 from the memory are not particularly limited.

Management of playback contents information classified to "category 3" will be explained below. As previously described, information corresponding to category 3 is necessary to maintain the apparatus, and unnecessary for a general user when he or she normally uses the apparatus. Therefore, the management method of category 3 does not make the user aware of the management setting or the like of category 3 when he or she performs a normal operation, so as not to bother him or her.

Normally, even when the user operates the menu window display key 63, the contents are not displayed on the screen. The controller 50 of the apparatus automatically records the contents in the nonvolatile memory 56. Since the capacity of the nonvolatile memory 56 is limited, not all operations are recorded. That is, only the number of times of operation is counted for a certain operation, or old operation information is automatically erased. Also, to debug software, information is recorded only during debugging, and the information is erased when debugging is complete.

As described above, a general user is rarely forced to confirm the contents of information of category 3 or change the management setting of the information. Accordingly, it is only necessary to allow a person with expert knowledge to change and confirm the management setting as a maintenance mode. For example, communication is performed from the outside to the apparatus to switch the apparatus to the maintenance mode.

Management of photographing environmental information classified to "category 4" will be explained. A recording destination, of information classified to category 4 is the same recording medium as photographed images. For example, when motion image data of a photographed object is to be recorded in the first recording medium 33 in the motion image photographing mode, the corresponding photographing environmental information such as the photographing location and photographing time is also recorded in the first recording medium 33. Whether to record, play back, transfer, copy, erase, or display information is set in accordance with the purpose of each operation mode of the apparatus. No limitations for preventing these operations in order to protect the privacy are set for information of category 4.

The way the actual apparatus processes information classified into the above categories will be described below.

First, the relations between the information belonging to category 1 and the operation modes will be explained. Information belonging to category 1 is used in any of the above operation modes. In the still image mode, motion image recording mode, and motion image playback mode, only a certain specific person may be permitted to perform a recording operation or playback operation, or the use of some functions may be limited. In the external connection mode, information is used for individual authentication to connect the apparatus to a network or the like.

As described above, the information belonging to category 1 can be used in any operation mode. However, it is cumbersome for the user to confirm or set information management whenever he or she operates the apparatus. Therefore, when, for example, the user purchases the apparatus and uses it for the first time, a process of confirming the way the information of category 1 is to be handled is executed. When this confirmation process is executed once, the execution is stored as a flag in the nonvolatile memory of the apparatus. Therefore, when the user uses the apparatus for the second time or after that, no confirmation process is executed again. However, this confirmation process is executed if a new user is registered and the registered user uses the apparatus for the first time.

This obviates the need to execute the confirmation process whenever the user switches on and activates the apparatus, and eliminates the cumbersome operation.

Figure 4:
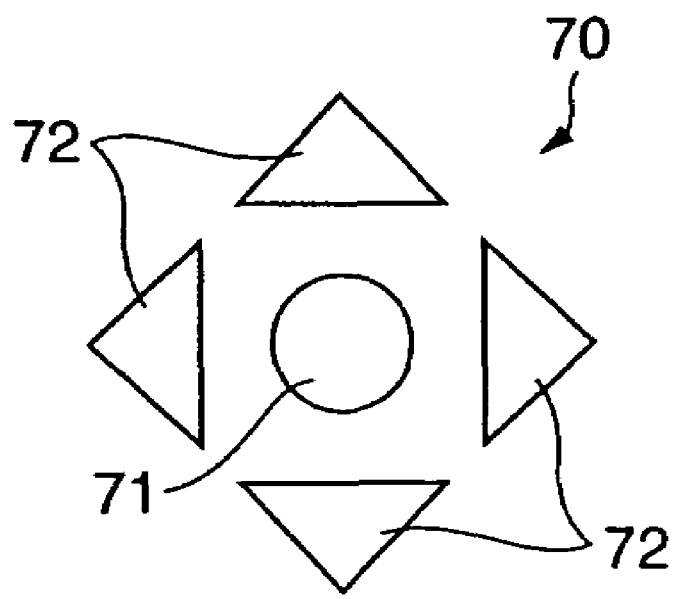
FIG. 4 is a plan view showing cursor keys and an enter switch of an operation unit.

If, however, the user wants to change the way the information of category 1 is handled by the apparatus, and to confirm the set contents, it is necessary to allow the user to freely execute the operation. In this embodiment, the user can display the menu windows as shown in FIGS. 5 to 9 on the display 28 by operating the operation unit 70 having the cross cursor keys 72 and enter key 71, and selects confirmation, execution, or cancellation by operating the operation unit 70, shown in FIG. 4.

As described above, items which can be confirmed in this operation are those related to the method of managing the information of category 1. Information with which an individual can be identified, e.g., a fingerprint image itself, is not displayed by this operation.

The user can also erase information by displaying another menu window and following a predetermined procedure.

Next, the relations between the information belonging to category 2 and the operation modes will be described. The information belonging to category 2 is playback contents information. Therefore, this information can be used in the motion image playback mode and still image playback mode, and can also be used in the external connection mode if the data is played back by a remote operation across a network.

Figure 12:
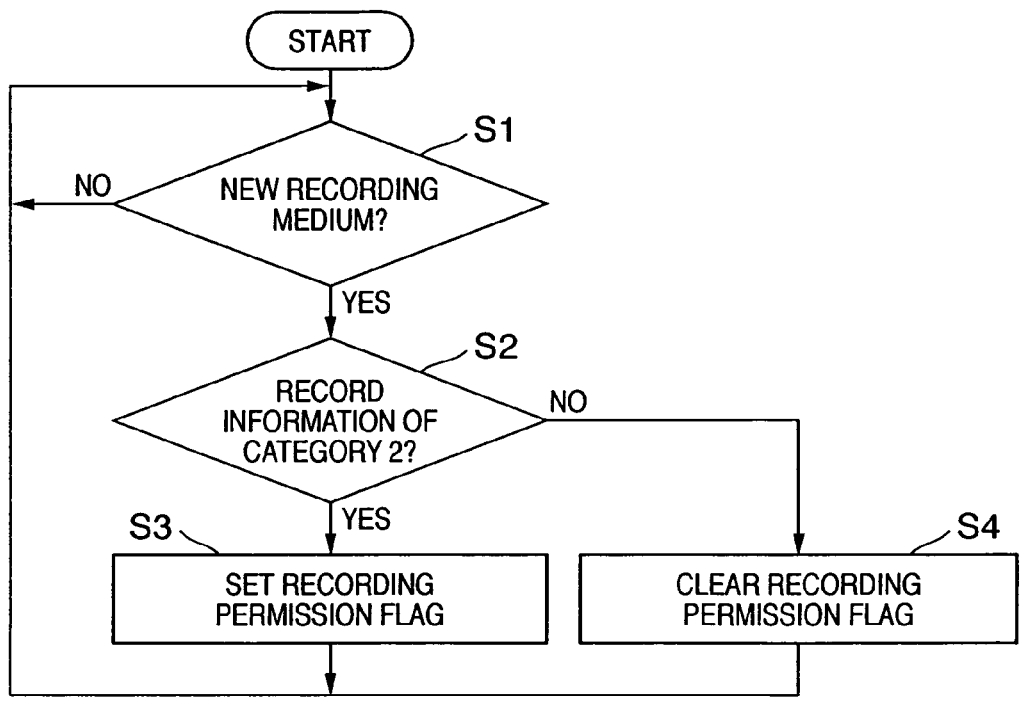
FIG. 12 is a flowchart for explaining a recording permission determination process in the video recorder integrated with a camera according to the embodiment of the present invention.

Assuming that a medium to be played back is attached to the apparatus, the operation sequence of the controller will be explained below with reference to FIG. 12.

First, whether a new recording medium is attached is determined (S1). This process is performed by monitoring an output from the recording medium attachment sensor 98. If a new recording medium is attached (S1), whether the user permits the information classified to category 2 to be recorded in the nonvolatile memory 56 is determined (S2). That is, a window for asking the user for permission as shown in FIG. 8 is displayed on the display 28. The user operates the operation unit 70 or the like to select whether to permit recording.

If recording is permitted (S2), a recording permission flag is set in the system controller 50 (S3). If recording is not permitted (S2), the recording permission flag is cleared (S4). The value of this recording permission flag is maintained until a new recording medium is attached next time (S1).

If the playback contents of the recording medium are changed while the recording permission flag is set, information indicating recording of the contents information as shown in FIG. 11 is displayed on the display screen for a predetermined time. Playback contents are changed when, for example, a plurality of contents are present in one recording medium and playback of the first contents is switched to playback of the second contents. This information is displayed in order to notify the user that contents information of the new contents is being recorded in the apparatus. This information is not always displayed during playback, but is displayed only for a predetermined time when playback contents are changed. After that, the normal display as shown in FIG. 10 is returned.

In this embodiment as described above, the user is notified of necessary information with minimum interruption to the appreciation of played back images. This allows the user to know that contents information is being recorded in the apparatus. If the user does not want to permit recording, he or she can immediately change or erase the management setting.

The relations between the information belonging to category 3 and the operation modes will be described below. As explained earlier, information belonging to category 3 is necessary for maintenance of the apparatus. This information is rarely necessary for a general user in a normal operation. Therefore, it is preferable to make the user unaware of the management setting of category 3 so as not to bother him or her. Accordingly, information to be recorded and an operation mode for the recording are set by communication from the outside to the apparatus in accordance with the purpose, e.g., management of the number of times of use of a part or debugging of installed software.

The relations between the information belonging to category 4 and the operation modes will be described below. The information belonging to category 4 relates to the environment of photographing. Therefore, this information is naturally used in the motion image recording mode and still image recording mode. The information is also used in the external connection mode because photographing may be performed by a remote operation across a network.

To automatically record the photographing location, the position information sensor 120 such as a GSP is necessary. To record information such as the temperature and humidity, the sensors 121 and 122 are necessary. However, not all of these pieces of information are necessary, so information can be selectively recorded in accordance with the purpose of the apparatus. In the case of a common camera, it is useful to record time information and position information.

The management setting of the information belonging to category 4 can be confirmed and changed in operation windows such as shown in FIGS. 6 and 7 by activating the confirmation change menu.

In the above embodiment, categories and information belonging to these categories are predetermined. However, in accordance with the form of a product to be practiced and the purpose of the product, customization is also made possible so that the user can change categories and the contents of information belonging to the categories. The management setting may also be changed from one user to another. In this case, when the apparatus is to be shared by a plurality of persons or to be lent, the management setting can be changed in accordance with the way each user uses the apparatus and with each user's consciousness to his or her privacy. As a consequence, privacy information management suited to the user and purpose can be performed.

The display examples of the setting windows and the setting method using the members of the operation unit 70 in the above embodiment are merely examples for indicating the concept, so the method of the above embodiment is, of course, not the unique method.

As can be readily understood from the above explanation, the present invention allows a user to prevent a leak of privacy information resulting from operations of the apparatus by using a simple method.

In particular, the user can easily know the type of information recorded in the apparatus, and the way the information is managed. This allows the user to operate the apparatus with a sense of security. Since the management setting can be changed, privacy protection corresponding to the purpose of the user can be performed. In addition, the management setting can be simply confirmed and changed without any large operating member such as a keyboard or mouse, or any high-resolution display member.

Also, the operation of urging the user to set a management method for each category is appropriately executed as needed for each category. For example, the information corresponding to category 3 which is required for maintenance of the apparatus is not necessary for a general user when he or she normally uses the apparatus. Accordingly, the management setting window or the like of category 3 is not displayed for the user during a normal operation. Likewise, playback contents of category 2 are displayed only when the playback contents are changed. In this manner, the frequency timing at which the user is urged to set a management method is appropriately changed from one category to another. During a normal operation, therefore, the user can effectively concentrate on the operation of the apparatus without any trouble.

Information required for analysis of an operation error or repair is recorded in the apparatus independently of privacy information. Therefore, if, for example, an incomprehensible operation or failure occurs in the apparatus while the user is using it, the manufacturer can immediately and appropriately advise the user or repair the apparatus. Since this can reduce the time and cost of repair, both the manufacturer and user are benefited. Also, only privacy information can be erased independently of information necessary for repair. Accordingly, the areas of interests of the user do not leak out even when he or she lends the apparatus to another person or sends the apparatus for repair.

Recording of the photographing environmental information makes it possible to appropriately record the status of photographing in the image sensing recording/playback apparatus. In addition, it is possible to prevent a leak of the played back contents to the outside, thereby preventing a leak of the testes and interests of the user to the outside.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for recording photographed image information in a removable recording medium and playing back the recorded image information from the removable recording medium, wherein the removable recording medium can be attached to or removed from the apparatus, said apparatus comprises a nonvolatile memory other than the removable recording medium, said apparatus being configured to store other information, which is different from the image information, in the nonvolatile memory, the other information includes (1) a personal information for identifying a user and (2) a playback contents information representing time when the recorded image information was played back from the recoding medium, (3) a title of the image information played back, and (4) unplayed back portion of the image information, wherein the apparatus displays a first confirmation window to ask an operator whether the personal information is to be erased, if an instruction to erase the personal information is issued by the operator, the apparatus erases the personal information from the nonvolatile memory, and if an instruction to erase the personal information is not issued by the operator, the apparatus automatically erases the personal information from the nonvolatile memory after a predetermined period of time has expired, and wherein the apparatus further displays a second confirmation window different from the first confirmation window to ask the operator whether the playback contents information is to be erased, if an instruction to erase the playback contents information is issued by the operator, the apparatus erases the playback contents information from the nonvolatile memory.

2. A method for recording photographed image information in a removable recording medium and playing back the recorded image information from the removable recording medium, wherein the removable recording medium can be attached to or removed from an apparatus, and the apparatus comprises a nonvolatile memory other than the removable recording medium, comprising:

storing other information, which is different from the image information, in the nonvolatile memory, the other information includes (1) a personal information for identifying a user and (2) a playback contents information representing time when the recorded image information was played back from the recoding medium, (3) a title of the image information played back, and (4) unplayed back portion of the image information, displaying a first confirmation window to ask an operator whether the personal information is to be erased, if an instruction to erase the personal information is issued by the operator, erasing the personal information from the nonvolatile memory, and if an instruction to erase the personal information is not issued by the operator, automatically erasing the personal information from the nonvolatile memory after a predetermined period of time has expired, and displaying a second confirmation window different from the first confirmation window to ask the operator whether the playback contents information is to be erased, if an instruction to erase the playback contents information is issued by the operator, erasing the playback contents information from the nonvolatile memory.

3. A playback apparatus, comprising:

a playback unit configured to play back a plurality of contents of image data from a removable recording medium, wherein the removable recording medium can be attached to or removed from the playback apparatus, a generating unit configured to generate content management information in accordance with a playback operation of the image data from the recording medium by the play back unit, the content management information includes (1) information of a time when the image data were played back by the play back unit, (2) information of title of the image data played back by the play back unit, and (3) information of an end of an already played back portion of the image data played back by the play back unit;

a nonvolatile memory other than the removable recording medium;

a display unit configured to display, in response to the removable recording medium is attached to the playback apparatus, a confirmation window to ask an operator whether the apparatus is permitted to store the content management information into the nonvolatile memory, wherein the display unit displays the confirmation window every time a new removable recording medium, which has never been attached to the playback apparatus, is attached to the playback apparatus; and a controller configured to store the content management information into the nonvolatile memory, if the apparatus is permitted to store content management information via the confirmation window by the operator, wherein said display unit also displays, in response to an instruction to display a delete window, the delete window to ask an operator whether the content management information is to be erased, by indicating in the delete window a plurality of titles of the image data based on the content management information stored in the nonvolatile memory, and the controller erases from the nonvolatile memory the content management information corresponding to the title selected in the delete window by the operator.

* * * * *